United States Patent
Gierling

(10) Patent No.: US 6,224,509 B1
(45) Date of Patent: May 1, 2001

(54) METHOD FOR MONITORING OF A CONTINUOUSLY VARIABLE TRANSMISSION

(75) Inventor: Armin Gierling, Langenargen (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/496,545

(22) Filed: Feb. 2, 2000

(30) Foreign Application Priority Data

Feb. 6, 1999 (DE) .................................... 199 04 920

(51) Int. Cl.[7] ........................................... F16H 59/06
(52) U.S. Cl. ............................................ 477/45; 474/28
(58) Field of Search ................................ 477/45; 474/28

(56) References Cited

U.S. PATENT DOCUMENTS

| | | | |
|---|---|---|---|
| 5,054,450 | * 10/1991 | Oota et al. | 123/478 |
| 5,665,023 | * 9/1997 | Aoki et al. | 477/48 |
| 5,944,626 | * 8/1999 | Spiess et al. | 474/28 |
| 5,961,408 | * 10/1999 | Konig et al. | 474/18 |
| 6,090,000 | * 7/2000 | Senger | 474/18 |

FOREIGN PATENT DOCUMENTS 44 36 506 A1  4/1996 (DE).

* cited by examiner

*Primary Examiner*—Dirk Wright
(74) *Attorney, Agent, or Firm*—Davis & Bujold, P.L.L.C.

(57) ABSTRACT

The method for monitoring a continuously variable transmission (CVT) with a variator for adjustment of the speed ratio, which has its primary and secondary adjustment devices respectively controlled by a pressure-regulating valve, consists of a travel monitoring and/or pressure monitoring of the pressure-regulating valves wherein in case of detection of an incorrect operation the power-flow transmitting clutch is opened.

8 Claims, 1 Drawing Sheet

METHOD FOR MONITORING OF A CONTINUOUSLY VARIABLE TRANSMISSION

BACKGROUND OF THE INVENTION

This invention relates to a method for monitoring a continuously variable transmission (CVT) driven by an input unit, preferably for a motor vehicle. Continuously variable transmissions have a variator for adjusting the speed ratio between a lowest reduction step (LOW) and a highest reduction step (OD). The variators known work according to the toroidal or continuously variable principle.

One such continuously variable transmission usually is connected with an internal combustion engine or an electromotor by an input shaft. DE A 44 36 506 thus describes a continuously variable transmission which has a hydrodynamic converter with lock-up clutch, a reversing gear set, a first bevel pulley pair, a second bevel pulley pair, a drive belt and a hydraulic and electronic control device. The input shaft drives the hydrodynamic converter consisting of an impeller, a turbine wheel and a stator. With the hydrodynamic converter is associated a converter lock-up clutch. The turbine wheel and the converter lock-up clutch are connected with the transmission input shaft. The latter drives a reversing gear set by which the rotational speed of the transmission input shaft is directly transmitted to the first bevel pulley pair or the direction is changed for reverse gear. The variator is designed as belt drive variator having one bevel pulley pair, respectively, on an input and output shaft and a drive belt which rotates between the bevel pulley pairs, the bevel pulley pair situated on the input shaft having one bevel pulley stationary in axial direction and one primary pulley movable in axial direction by means of a first adjusting space and of a primary pressure-regulating valve and the bevel pulley pair situated on the output shaft having one bevel pulley stationary in axial direction and one secondary pulley movable in axial direction by means of a second adjusting space and of a secondary pressure-regulating valve independent of the primary pressure-regulating valve and having an electronic control unit which determines via electromagnetic actuators and hydraulic valves the pressure level of the adjusting space of primary pulley and secondary pulley. As a result of the axial mobility of primary pulley and secondary pulley, the rotation radius of the drive belt, here designed as sliding member belt, changes and therewith the ratio of the continuously variable transmission. The output takes place via an output shaft.

The continuously variable transmission, i.e. the CVT, is controlled by an electronic control unit by means of electromagnetic actuators and hydraulic valves, which regulate clutches and brakes and the pressure distribution thereof as a function of input variables such as a signal of a load position of the input unit, rotational speed of a transmission input shaft, rotational speed of an output shaft or temperature of a pressure medium.

The electronic control unit determines from input variables an operation point and adjusts the corresponding rotational speeds of the variator or the speed ratio of the CVT. If a serious error occurs, a transmission diagnosis function is activated and the CVT changes over to an emergency running operation. By emergency running operation is a state of the CVT in which there takes place no rotational speed regulation and no contact pressure regulation of the secondary pulley on the part of the electronic transmission control. To make possible this emergency running operation in which a constant pressure ratio or power ratio is maintained between primary pulley and secondary pulley with constant pressure level of the adjusting space of the secondary pulley, pre-controlled emergency valves are provided which act upon the pressure-regulating valves of the variator.

Important components of one such CVT are, in particular, the primary pressure circuit and the secondary pressure circuit for actuating the adjusting spaces of the variator formed by the bevel pulley pairs and the belt drive organ, on one hand, for the torque-dependent contact of the belt drive organ and, on the other, for setting the speed ratio. The primary pulley and the secondary pulley of the variator are controlled by pressure-regulating valves independent of each other which, in turn, are supplied by a superposed main pressure circuit.

Subject to principle, primary and secondary pressure-regulating valves are hydraulic components of high precision and essentially important with regard to the safety of the system. An undetected incorrect function of one of the valves can lead to an undesired speed ratio adjustment and thus to a driving state critical to safety.

The problem to be solved by the invention is to provide a method for monitoring a CVT with which incorrect operation of the primary pressure-regulating valve and/or of the secondary pressure-regulating valve is detected so that steps can be taken in both driving situations critical to safety and secondary failures in the transmission proper.

SUMMARY OF THE INVENTION

Therefore, it is proposed, according to the invention, that travel and/or pressure of the primary pressure-regulating valve and/or the secondary pressure-regulating valve be monitored continuously or during discrete test cycles and that when an incorrect operation of one of said pressure-regulating valves be detected, the power-flow conducting clutch is opened and a signal preventing the engine speed increase be transmitted to the electronic engine control.

The method provides a speed ratio protection of primary and secondary pressure circuits, especially during a blockage of a piston in a primary pressure-regulating valve and/or secondary pressure-regulating valve either on a tank leading edges or on the pressure leading edges.

BRIEF DESCRIPTION OF THE DRAWINGS

The invention is described herebelow in further detail with reference to the drawing wherein FIG. 1 shown is a hydraulic diagram for the CVT with which the inventive method can be carried out and in which reference numerals have been given only to the parts essential for the understanding of the invention.

DESCRIPTION OF THE PREFERRED EMBODIMENT

Figure 1:
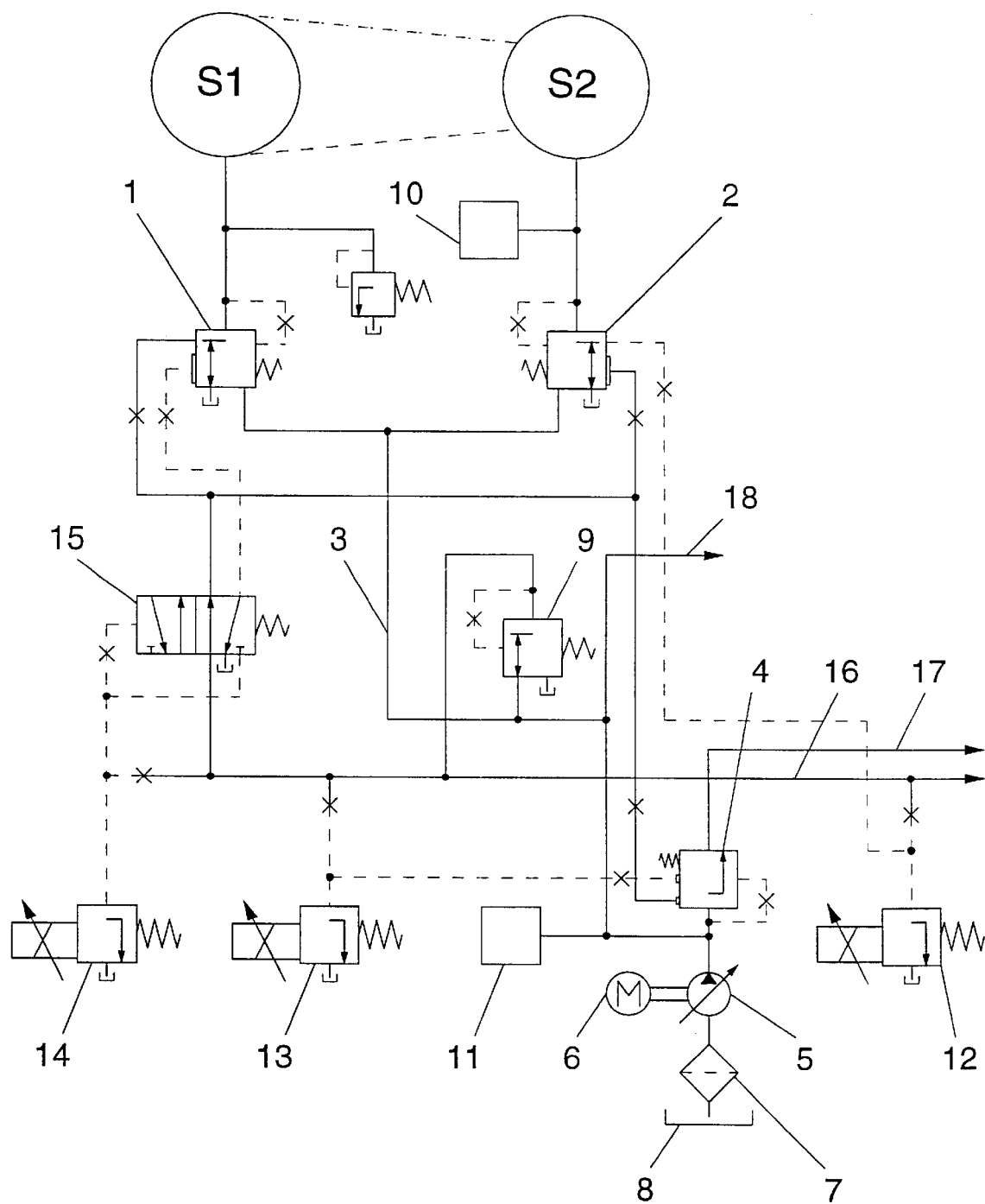

The axially adjustable primary pulley S1 and the axially adjustable secondary pulley S2 of a belt drive variator the adjusting spaces, not shown, of which are controlled by a primary pressure-regulating valve 1 or a secondary pressure-regulating valve 2. The two pressure-regulating valves are supplied by a superposed main pressure valve 4 via a line 3, the fluid being fed to the main pressure valve 4 from a sump 8 via a pump 5 connected with an engine 6 and a filter 7. A pressure-reducing valve 9, with pressure sensors (10,11) and lines 16, 17, 18 are added for other consumers with electromagnetic pressure-regulating valves 12, 13, 14.

Similarly as described in DE A 44 36 506 cited above, the CVT can be provided with an emergency running device which activates a hydraulic emergency program with a constant pressure ratio between primary and secondary pressure in the adjustment spaces of primary pulley and secondary pulley for the case of failure of the electronic control unit. For this purpose an emergency valve 15 is provided.

According to the invention, the operations of primary pressure-regulating valve 1 and secondary pressure-regulating valve 2 are monitored, the extreme situations and fault consequences thereof being considered herebelow for definition of the ratio protection:

1. Primary valve blocked on the tank leading edge
   primary pressure independent of the primary pressure-regulation standard
   readjustment after LOW according to pressure standard on the secondary pulley (engine-torque dependent contact pressure)
   critical for driving safety
   torque-dependent slip between belt drive element and primary pulley in stationary state
   mechanical secondary failures on the variator
2. Primary valve blocked on the pressure leading edge
   primary pressure: maximum from cropping out secondary pressure and primary pressure regulation standard
   secondary pressure higher then theoretical value of primary pressure
   upshift after OD
   not critical for driving safety
   missing pressure protection and secondary pressure higher than admissible primary pressure
   mechanical secondary failures on the primary variator
3. Secondary valve blocked on the tank leading edge
   secondary pressure independent of the secondary pressure-regulation standard
   upshift after OD corresponding to pressure standard on the primary pulley
   not critical for driving safety
   torque-dependent slip between belt drive torque and secondary pulley in stationary state
   mechanical secondary failures on the variator
4. Secondary valve blocked on the pressure leading edge
   secondary pressure: maximum from cropping out primary pressure and secondary pressure regulation standard
   primary pressure higher than theoretical value of secondary pressure
   upshift after OD
   not critical for driving safety
   missing pressure protection and primary pressure higher than admissible secondary pressure (the latter is determined by construction and design but implorable)
   mechanical secondary failures on the secondary variator From this consideration of series of errors, it can be seen that monitoring the operation of the primary pressure-regulating valve to prevent driving situations critical to safety has top priority, monitoring in the area of the tank leading edge being sufficient in case of a constructionally provided pressure protection of the primary pressure-regulating valve; in case of a pressure protection of the primary pressure-regulating valve not having been constructionally provided, the monitoring has to extend also to the pressure leading edge. Monitoring the operation of the secondary pressure-regulating valve makes possible a limitation of damage by preventing slip.

For monitoring the operation of primary and/or secondary valve, it is proposed, according to the invention, to pressurize the valve with a test pulse and to evaluate either the valve travel as a reaction to the test pulse or the pressure resulting by the test pulse and the valve movement consequence thereof and to conclude therefrom on the satisfactory operation of the valve to be monitored.

The test pulse is conveniently transmitted by the electromagnetic actuator associated with the valve to be monitored for the normal functionality.

The test pulse is a time function and is to be particularly carried out so that no undesired adjustment reactions of the variator occur. The test pulse, e.g. is issued by the electronic transmission control as a very short current pulse which produces a very short pressure pulse of an electromagnetic actuator and thereby triggers in the valve to be monitored providing only a very short movement which, in turn, has as consequence of only such a short pressure change in the variator pressure-regulating circuit to be monitored that the adjusting system, as result of its own mechanical inertia, does not react with a noticeable adjustment.

In an advantageous development of the invention, four different ways are proposed for monitoring the operations of a primary and/or secondary pressure-regulating valve:

1. Travel monitoring of primary and/or secondary valve with active test pulse
   travel measurement of the valve piston movement by means of inductive or Hall sensor along the valve or as proximity transmitter toward the valve front face
   operation test during discrete test cycles by means of current supply of the associated electromagnetic actuator (pressure regulator)
   monitoring valve travel=valve travel_theor.±tolerance with valve travel_theor=f (test current, time)
   special advantage: precision
2. Travel monitoring of primary and/or secondary valve without test pulse
   travel measurement of the valve piston motion by means of inductive or Hall sensor disposed along the valve or, as proximity transmitter, toward the valve front face
   permanent operation test
   monitoring valve travel=valve travel_theor.±tolerance with valve travel_theor.=f (pressure-regulating current, time, pressure regulator, hysteresis, valve hysteresis)
   special advantage: steady testing without interfering in the current supply of the associated electromagnetic actuators (pressure regulators)
3. Pressure monitoring of primary and secondary valve with active test pulse
   pressure measurement by means of pressure or piezo receiver between valve and corresponding variator piston; measuring point as close as possible to the valve
   operation test during discrete test cycles by means of current supply of the associated electromagnetic actuators (pressure regulators)
   monitoring pressure=pressure_theor.±tolerance with pressure_theor.=f (test current, time, valve hysteresis, pressure elasticity of the span valve/variator)
   special advantages: among others, no additional measuring system, relative precision
4. Pressure monitoring of primary and/or secondary valve without test pulse
   pressure measurement by pressure or piezo receivers between valve and corresponding variator piston; measuring point as close as possible to the valve
   permanent operation test monitoring pressure=pressure_theor.±tolerance with
pressure_theor.=f (pressure-regulating current, time, pressure-regulating hysteresis, valve hysteresis, pressure elasticity of the span valve/variator)

special advantages: among others, no additional measuring system, steady testing without interfering in the current supply of the associated electromagnetic actuators (pressure regulators)

In all cases of a detected operation interruption in the primary and/or secondary pressure circuit of the CVT reaction now occurs with a substitute function on the side of the electronic transmission control. It is possible to prevent an activation of a hydraulic emergency system, such as described in the above in cited DE A 44 36 506, with mechanical action upon the control valves actuating the variator with pressure.

According to the invention, It is proposed that as substitute function the power-flow conducting clutch be opened either immediately, i.e. suddenly, or with a time-, pressure- and/or rotational-speed controlled ramp function.

A function triggered parallel to this of the electronic engine control to which is transmitted a corresponding signal by the electronic transmission control, e.g. an activation bit via a CAN data line or a control current via cables between EGS and engine electronic system, can limit the possible free engine uptake, e.g. by means of injection extraction or throttle valve withdrawal. This serves both for protection of the engine and for the acoustic relief of the driver.

REFERENCE NUMERALS 1 primary pressure-regulating valve
2 secondary pressure-regulating valve
3 line
4 main pressure valve
5 pump
6 engine
7 filter
8 sump
9 pressure-reducing valve
10 pressure sensor
11 pressure sensor
12 pressure-regulating valve
13 pressure-regulating valve
14 pressure regulating valve
15 emergency valve
16 lines
17 lines
18 lines
S1 primary pulley
S2 secondary pulley

What is claimed is:

1. A method for monitoring a continuously variable transmission (CVT) driven by an input unit with a variator for adjustment of speed ratio of a primary adjustment device on the input side and a secondary adjustment device on the output side, with an electrohydraulically controlled primary pressure circuit and an electrohydraulically controlled secondary pressure circuit for pressurizing the variator, for adjusting speed ratio, with a primary pressure-regulating valve for pressurizing the primary adjustment device and a secondary pressure regulating valve, independent of the primary pressure-regulating valve, for pressurizing the secondary adjustment device, wherein one of travel monitoring and pressure monitoring of at least one of the primary pressure regulating valve and the secondary pressure-regulating valve are carried out and in case of detection of an incorrect operation of the pressure-regulating valves, the power flow into the transmission is interrupted.

2. The method according to claim 1, wherein monitored valve or valves is monitored during discrete test cycles.

3. The method according to claim 1, wherein monitored valve or valves are monitored by means of travel measuring of valve piston motion with the aid of one of inductive and Hall sensors and the operation is tested with an active test pulse during discrete test cycles by supplying current to an electromagnetic actuator associated with the valve to be monitored.

4. The method according to claim 1, wherein monitored valve or valves are monitored by means of a pressure measurement with the aid of one of pressure and piezo receivers between a pressure-regulating valve and corresponding piston in the variator adjustment space, and that the operation is tested with an active test pulse during discrete test cycles by supplying current to an electromagnetic actuator associated with the valve to be monitored.

5. The method according to claim 1, wherein primary monitored valve or valves are monitored continuously.

6. The method according to claim 1, wherein primary monitored valve or valves are monitored by means of travel measuring of the valve piston motion and that the operation is permanently tested without a test pulse.

7. The method according to claim 1, wherein primary monitored valve or valves are monitored by means of pressure measurement and that the operation is permanently tested without a test pulse.

8. The method according to claim 1, wherein as an added error reaction, a signal leading to prevention of the engine speed increase is issued by the transmission control to the engine control.

* * * * *